(12) United States Patent
Ko

(10) Patent No.: US 7,467,753 B2
(45) Date of Patent: Dec. 23, 2008

(54) CONNECTING TUBE STRUCTURE

(75) Inventor: Hsi Chia Ko, Changhua Hsien (TW)

(73) Assignee: Chung Cheng Faucet Co., Ltd., Changhua Hsien (TW)

( * ) Notice: Subject to any disclaimer, the term of this patent is extended or adjusted under 35 U.S.C. 154(b) by 0 days.

(21) Appl. No.: 11/730,025

(22) Filed: Mar. 29, 2007

(65) Prior Publication Data

US 2008/0237375 A1 Oct. 2, 2008

(51) Int. Cl.
- *B05B 15/08* (2006.01)
- *B05B 9/00* (2006.01)
- *F16L 25/00* (2006.01)
- *F16L 35/00* (2006.01)

(52) U.S. Cl. .................. 239/587.1; 239/571; 285/334.5

(58) Field of Classification Search ................ 239/525, 239/526, 530, 532, 569, 570, 571, 587.1, 239/588; 285/334.1, 334.3, 334.5, 354, 389
See application file for complete search history.

(56) References Cited

U.S. PATENT DOCUMENTS

| 6,007,002 A | * | 12/1999 | Huber | 239/525 |
| 6,050,508 A | * | 4/2000 | Fan | 239/587.1 |
| 6,199,227 B1 | * | 3/2001 | Chen | 4/615 |
| 6,820,291 B1 | * | 11/2004 | Weaver | 4/695 |
| 6,880,768 B2 | * | 4/2005 | Lau | 239/526 |

* cited by examiner

*Primary Examiner*—Darren W Gorman
(74) *Attorney, Agent, or Firm*—Troxell Law Office, PLLC

(57) ABSTRACT

A connecting tube structure comprises a connecting tube, screw nuts, check valves, and a rotary water-sealing device wherein the connecting tube has a stop plate at one end to mount to a grooved seat of the rotary-sealing device and a cavity at the other end for the accommodation of one check valve with a movable plug supported by a spring to shut off water discharge from the faucet and prevent the return of dirty water. The rotary water-sealing device, having watertight O-rings adapted to the upper section and a V-shaped expanding side wall extending at the lower section, is sealed to the bottom and internal surface of the shower head and enclosed by the screw nut secured to the shower head, providing high- and-lower pressure water-sealing benefit as well as rotation in 360 degrees to prevent the connecting tube from getting twisted up and hindering the smooth transport of water supply.

8 Claims, 14 Drawing Sheets

CONNECTING TUBE STRUCTURE

BACKGROUND OF THE INVENTION

The present invention relates to a connecting tube structure, comprising a connecting tube with both ends respectively joined to a faucet and a shower head wherein the connecting tube has a stop plate at one end to mount to a grooved seat of a rotary-sealing device and a cavity at the other end for the accommodation of one check valve with a movable plug supported by a spring to shut off water discharge and prevent the return of dirty water. The rotary water-sealing device, having watertight O-rings adapted to the upper section and a V-shaped side wall extending at the lower section, is sealed to the bottom and internal surface of the shower head and enclosed by a screw nut secured to the shower head, providing high-and-lower pressure water-sealing benefit as well as rotation in 360 degrees thereby.

Please refer to FIGS. 1, 2. A conventional connecting tube structure includes a water-discharge body 1 having an external-threaded portion 11 extending at the bottom, and a T-shaped head 21 disposed at the end edge thereon to combine with a connecting tube 2 thereby. The T-shaped head 21 has a middle section defined by an annular groove 22 to which a washer 23 is accommodated, and a screw nut 24 is applied to enclose the T-shaped head 21 at the outer side of the connecting tube 2. The T-shaped head 21 is placed at one bottom edge 111 of the external-threaded portion 11 of the water-discharge body 1, and the screw nut 24 with an O-ring 12 is utilized to secure to the external-threaded portion 11 thereof. Therefore, the T-shaped head 21 is squeezed by the bottom edge 111 of the external-threaded portion 11 and enclosed by the screw nut 24 secured to the external threaded portion 11 thereof.

However, there are some drawbacks to such conventional connecting tube structure. Most of all, when the connecting tube 2 is combined with the water-discharge body 1, the T-shaped head 21 attached at the end edge of the connecting tube 2 is fixedly secured to the water-discharge body 1 as one unit. As a result, the water-discharge body 1 (e.g. a shower head) twisted and turned in application will wind up the connecting tube 2 therewith accordingly. Finally, the connecting tube 2 can get tied up and hinder the discharge of water supply. Besides, the connecting tube 2 twisted and turned in the long run can easily get worn off and become reduced in its durability thereby, which not only waste resources and money but can increase the amount of garbage. Furthermore, the T-shaped head 21 and the screw nut 24 are bound by one-way force, which can easily result in the disadvantage of water leakage. The water-discharge body 1 cannot properly shut off the water discharge via external or internal parts thereof, and even the connecting tube 2 fails to provide water-sealing function. Thus, water leakage and the return of dirty water happen over and over again, which can cause the waste of water resource as well as make dirty the places such as bathrooms or kitchens thereof.

SUMMARY OF THE PRESENT INVENTION

It is, therefore, the primary purpose of the present invention to provide a connecting tube structure, comprising a connecting tube, screw nuts, check valves and a rotary water-sealing device wherein the connecting tube with a screw nut respectively mounted at both ends thereon has one end secured to a threaded tube of a faucet and the other end joined to the bottom of a shower head. The connecting tube has one end defined by a cavity for the accommodation of one check valve therein and the other end equipped with a stop plate to mount to a grooved seat extending at the top of the rotary water-sealing device thereon. The check valve includes a movable plug having an arched head with an O-ring mounted thereon, which is flexibly supported by a spring to shut off the water discharge and prevent dirty water from returning to water supply thereby. And the rotary water-sealing device has an upper section defined by ringed grooves for the accommodation of watertight O-rings thereto and a lower section defined by an indentation with an expanding side wall extending thereon, providing high-and-lower pressure water-sealing benefit as well as rotation in 360 degrees to prevent the connecting tube from getting twisted up and hindering the smooth transport of water supply.

It is, therefore, the second purpose of the present invention to provide a connecting tube structure wherein the rotary water-sealing device has the outer periphery equipped with the watertight O-rings and the expanding side wall to match to an O-shaped ring clamped between the shower head and the screw nut secured to the shower head, forming both internal and external water shutoff effects to achieve dual water-sealing benefits thereby; whereby the connecting tube can also be fixed in one direction without being influenced by the rotation of the shower head, facilitating stable handling of the connecting tube in application. Besides, the connecting tube can also be assembled onto a water-discharge body of different standards for use.

DETAILED DESCRIPTION OF THE PREFERRED EMBODIMENTS

Figure 1:
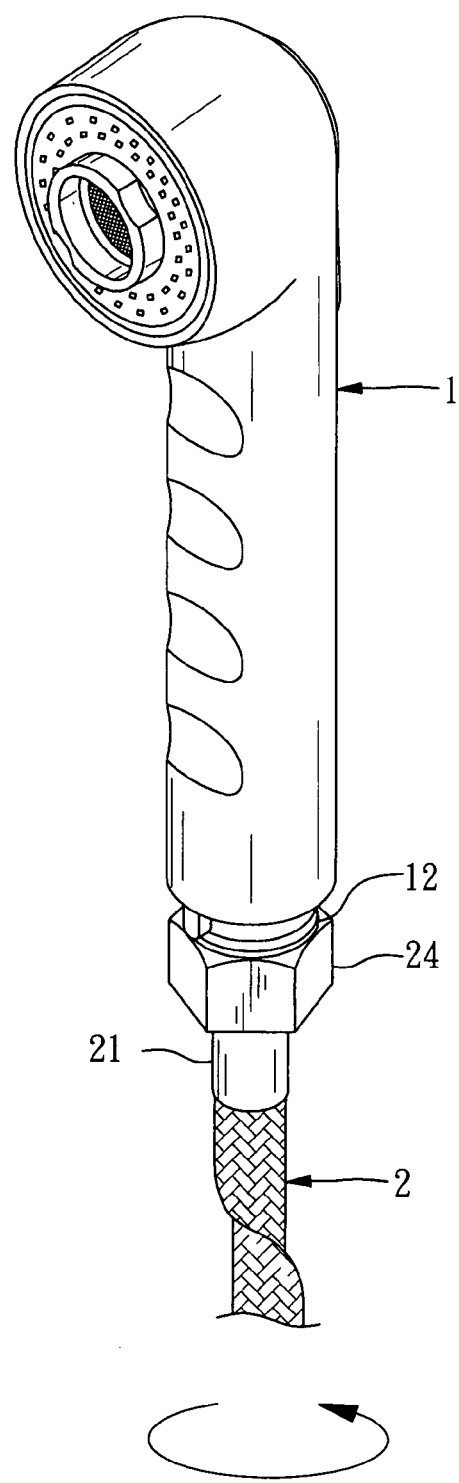
FIG. 1 is a perspective view of a conventional connecting tube twisted in application.
Figure 2:
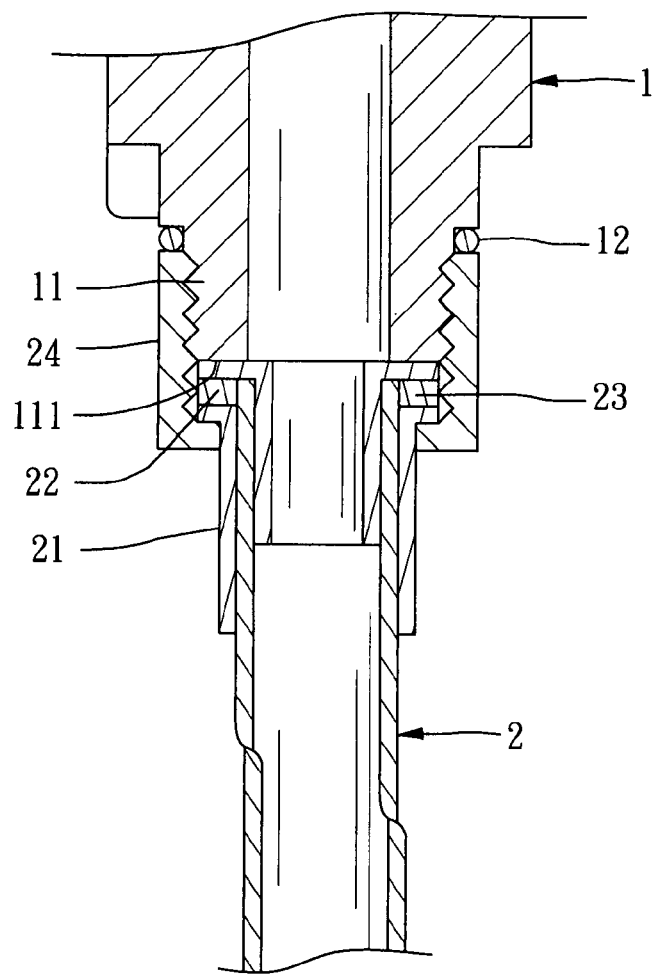
FIG. 2 is a partially assembled and cross sectional view of the conventional connecting tube as shown in FIG. 1.
Figure 3:
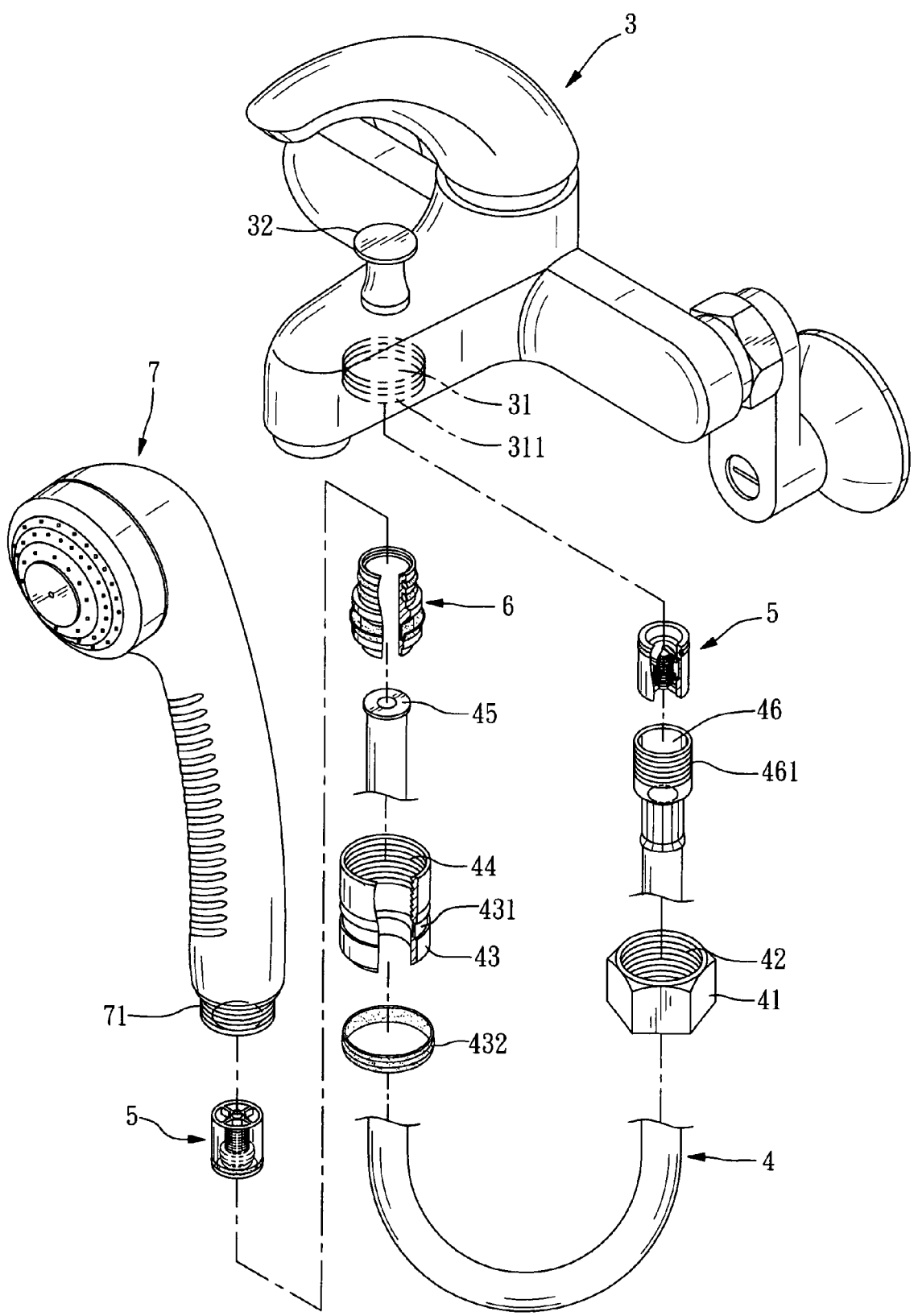
FIG. 3 is an exploded perspective view of the present invention.
Figure 4:
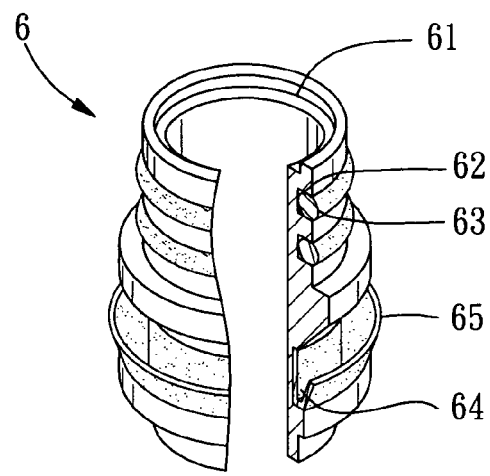
FIG. 4 is an enlarged perspective view of a rotary water-sealing device of the present invention.
Figure 5:
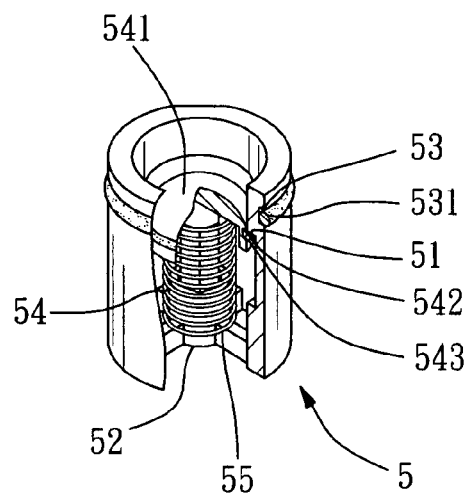
FIG. 5 is an enlarged perspective view of a check valve of the present invention.
Figure 7:
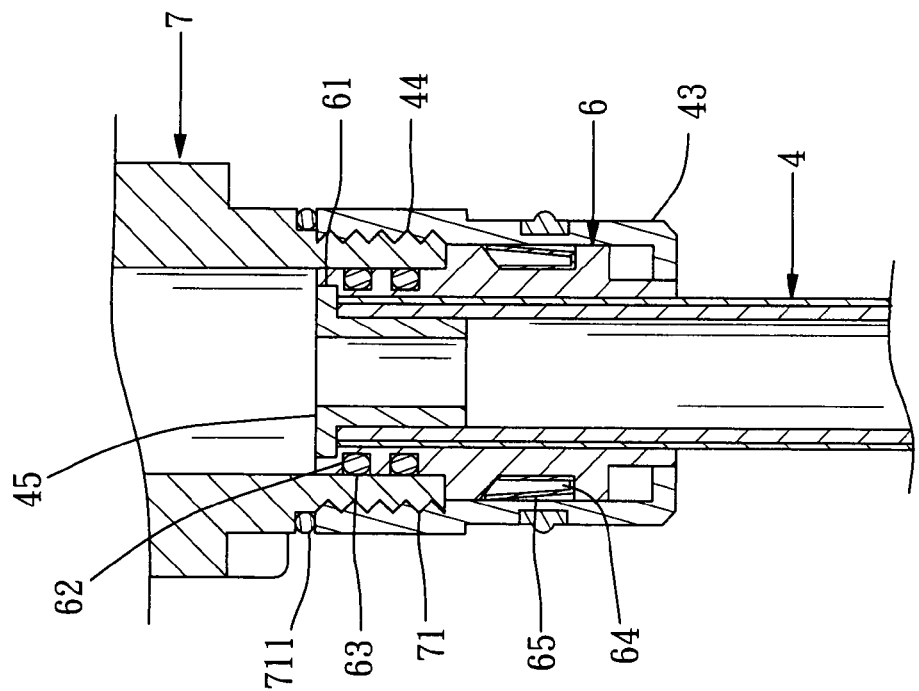
FIG. 7 is an assembled cross sectional view of the present invention assembled to a shower head.
Figure 6:
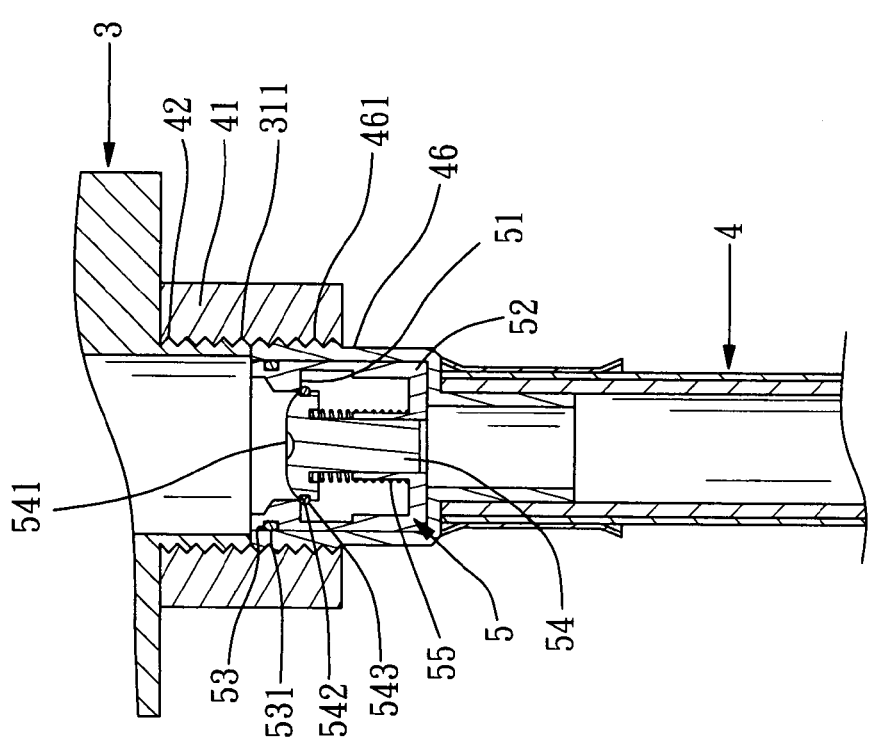
FIG. 6 is an assembled cross sectional view of the present invention mounted to a faucet.

Please refer to FIGS. 3 to 7 inclusive. The present invention relates to a connecting tube structure, comprising a connecting tube 4, a set of first and second screw nuts 41, 43, check valves 5, and a rotary water-sealing device 6. The first screw nut 41 defined by internal screw threads 42 to secure to a threaded tube 31 extending at the bottom of a faucet 3 with a switch button 32 disposed thereon is attached to one end of the connecting tube 4 while the second screw nut 43 defined by an internal-threaded section 44 to fix to an outer-threaded section 71 of a shower head 7 is mounted to the other end of the connecting tube 4. The connecting tube 4 has one end edge defined by a cavity 46 with an external-threaded section 461 disposed thereon, and one check valve 5 is accommodated into the cavity 46 thereof. The connecting tube 4 has a stop plate 45 disposed at the other end to be located in place at a grooved seat 61 extending at the top of the rotary water-sealing device 6, and another check valve 5 is mounted on top of the stop plate 45 thereon. Referring to FIG. 5, the check valve 5, made in a hollow tubular shape, has an annular groove 53 defining the outer periphery thereon for the accommodation of an O-ring 531 thereto, and is inserted to the cavity 46 disposed at one end of the connecting tube 4 so as to provide an external water shutoff effect thereby. The check valve 5 includes a frame seat 52 disposed at the internal lower section, and a movable plug 54 mounted therein and flexibly supported by a spring 55 to shut off water supply thereby. The movable plug 54 also has an arched head 541 defining the top portion thereon, and an indented groove 542 defining the outer periphery thereon for the mounting of a waterproof ring 543 thereto to be stopped at an internal flange 51 of the check valve 5. The first screw nut 41 is secured to the threaded tube 31 of the faucet 3 having outer screw threads 311 defining thereon. The rotary water-sealing device 6 includes an upper section defined by more than one ringed groove 62 with a watertight O-ring 63 adapted thereto, and a lower section defined by an indentation 64 with a V-shaped outward-expanding side wall 65 extending thereon. Thus, the stop plate 45 of the connecting tube 4 is accommodated to support at the internal bottom side of the shower head 7, and the watertight O-rings 63 mounted at the upper section of the rotary water-sealing device 6 are allowed to seal tight onto the internal surface at the bottom of the shower head 7. Then, the V-shaped expanding side wall 65 is squeezed and enclosed by the internal surface of the second screw nut 43 with the internal-threaded section 44 secured to the outer-threaded section 71 of the shower head 7. The second screw nut 43 also has the upper edge clamping against an O-shaped ring 711 mounted on top of the outer-threaded section 71 thereon.

Figure 8:
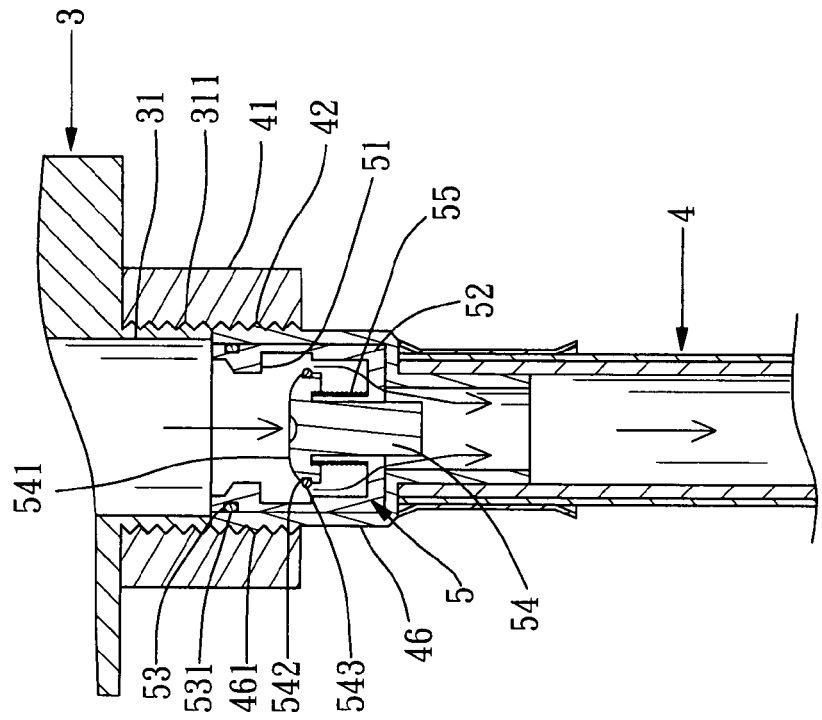
FIG. 8 is a diagram showing the check valve of the present invention in the state of water shutoff thereof.
Figure 9:
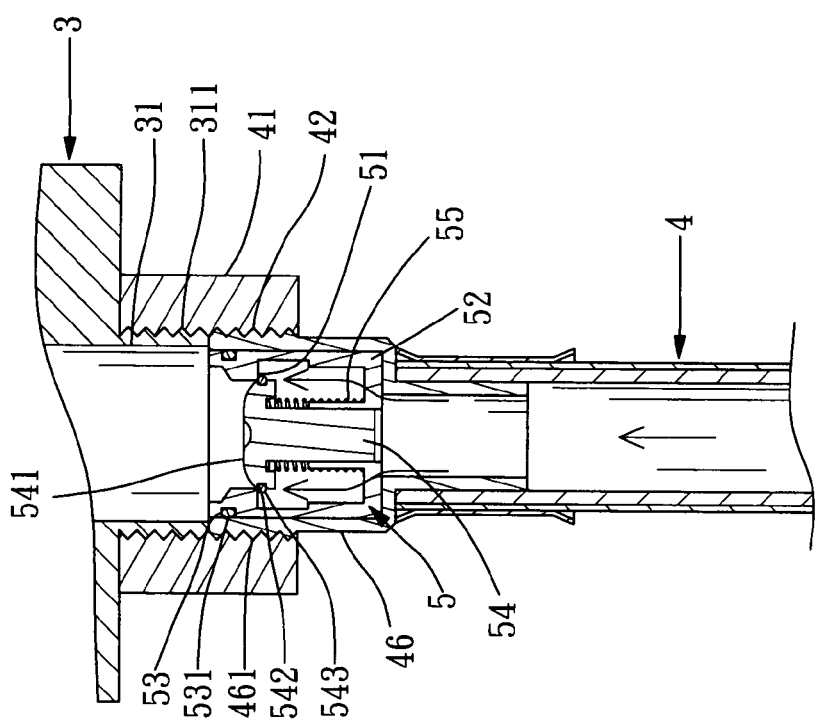
FIG. 9 is a diagram showing the check valve of the present invention in the state of water inlet thereof.

Please refer to FIGS. 8, 9. When the water discharge is switched off, the water pressure inside the connecting tube 4 is larger than the pressure of water inlet. Then the movable plug 54 mounted inside the check valve 54 will be bounced back by the return force of the spring 55 to recover its primary position wherein the waterproof O-ring 543 accommodated into the indented groove 542 of the arched head 541 thereof will return to stop at the internal flange 51 of the check valve 5 so as to shut off the water supply coming from the threaded tube 31 extending at the bottom of the faucet 3. When water flow discharges outwards through the other end of the connecting tube 4, the pressure inside the connecting tube 4 will become smaller, while the water-outlet pressure of the threaded tube 31 become larger. Then, the arched head 541 of the movable plug 54 primarily abutting against the internal flange 51 thereon will be pressed downwards, compressing the spring 55 therewith and the movable plug 54 will descend along the frame seat 52 accordingly. Thus, the water supply from the faucet 3 will be transported via the threaded tube 31 to flow through the arched head 541 and then the frame seat 52 disposed at the bottom of the check valve 5 to enter the connecting tube 4 thereby.

Figure 10:
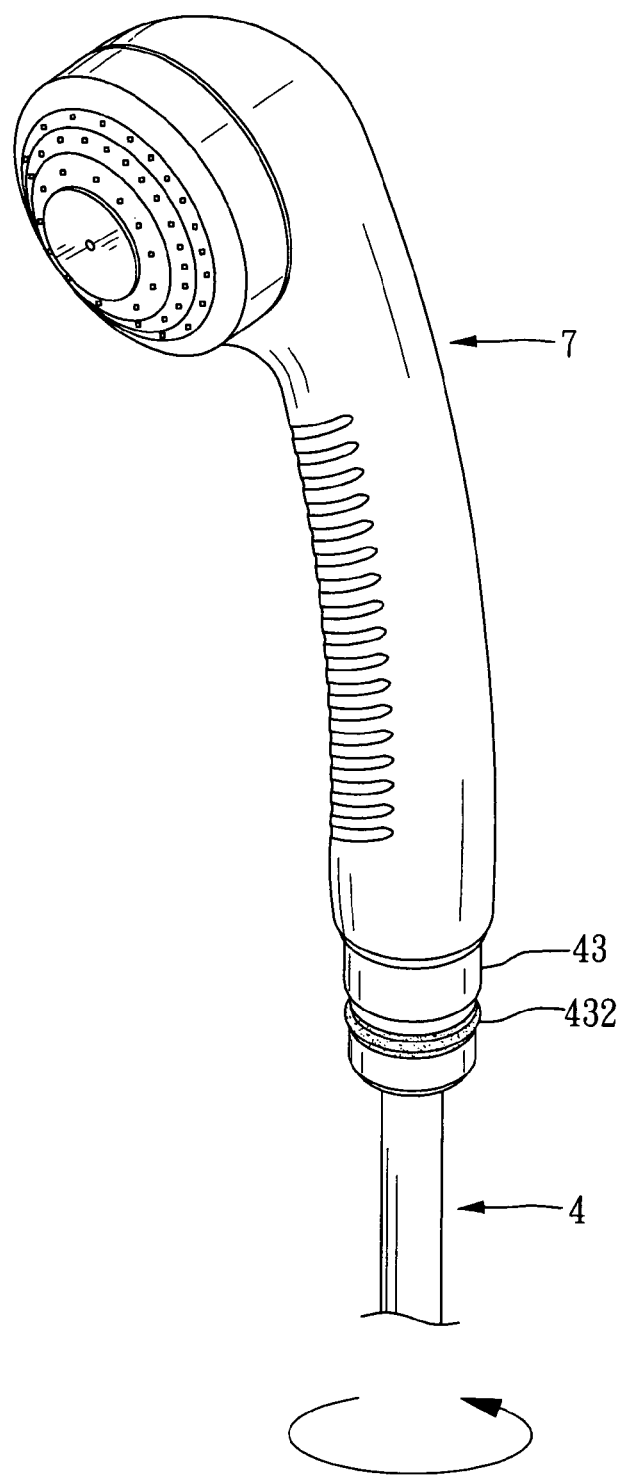
FIG. 10 is a diagram showing the present invention applied to a shower head.
Figure 11:
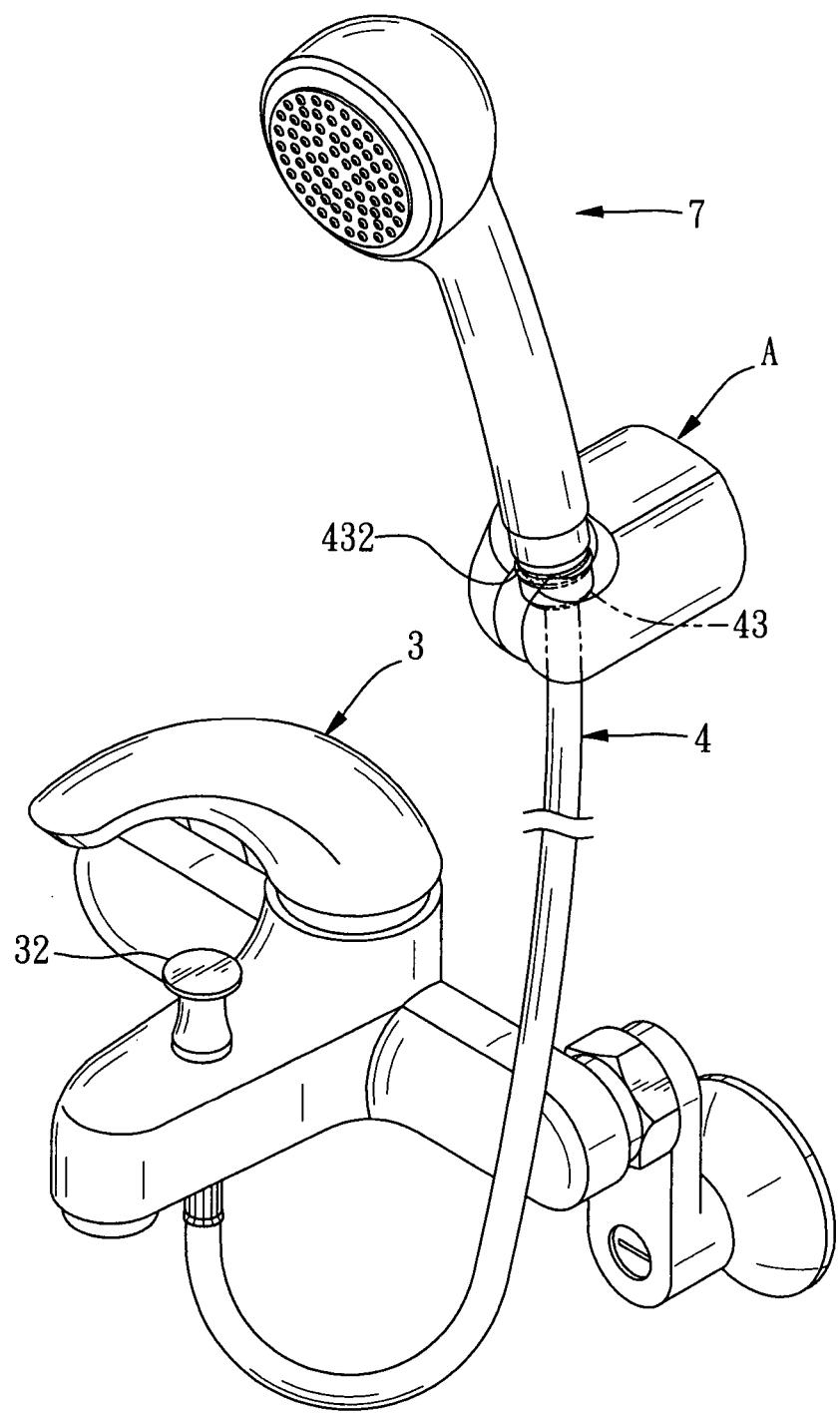
FIG. 11 is a diagram showing the present invention applied to a faucet and a shower head thereof.
Figure 12:
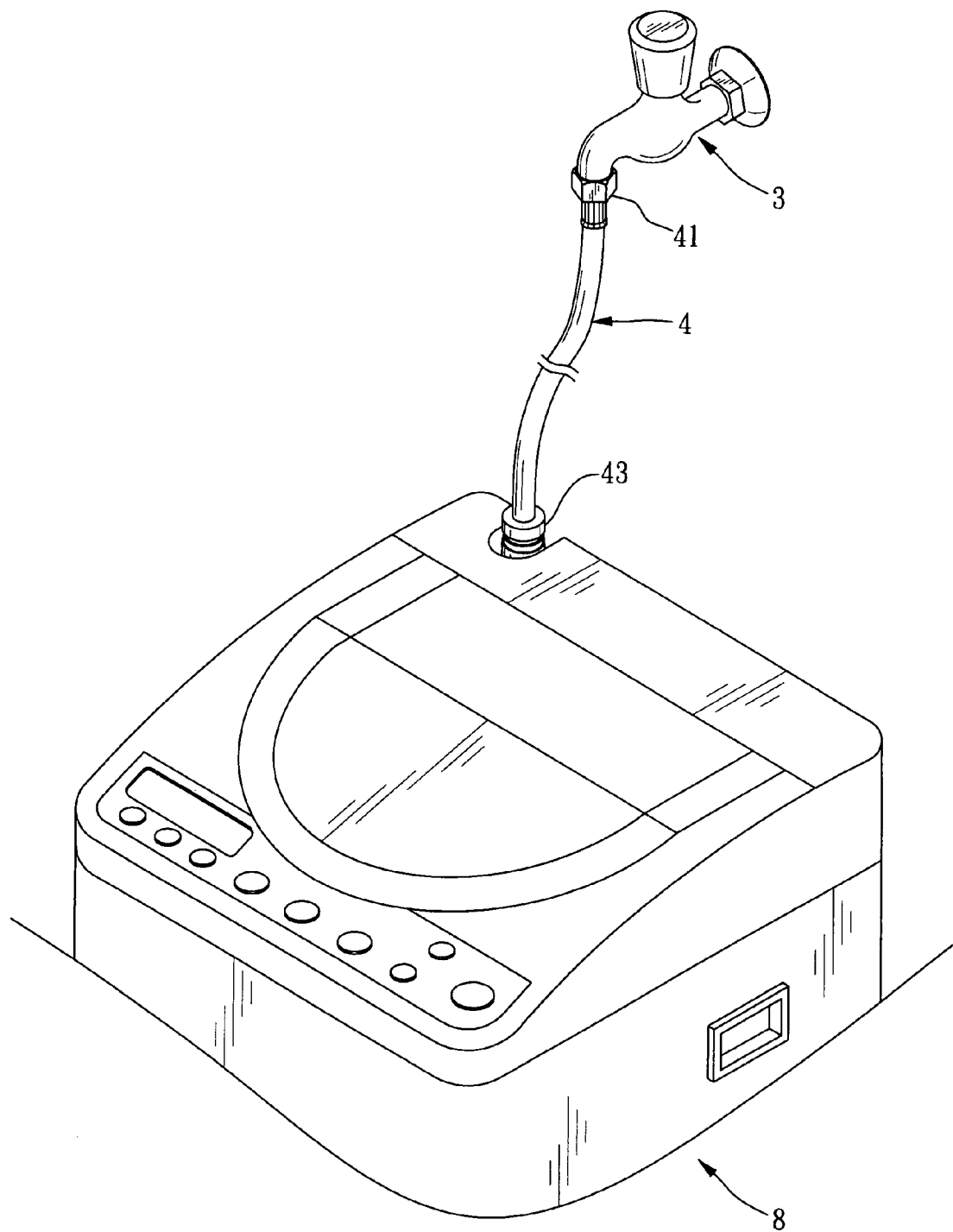
FIG. 12 is a diagram showing the present invention applied to a washing machine.

Please refer to FIG. 10. The connecting tube 4 is equipped with the stop plate 45 to accommodate and support at the internal bottom side of the shower head 7. Besides, the rotary water-sealing device 6 mounted to the connecting tube 4 is inserted to have the watertight O-rings 63 adapted to the ringed grooves 62 at the upper section thereon abutting against the internal surface of the shower head 7. Furthermore, the second screw nut 43 is secured up to the outer-threaded section 71 of the shower head 7 to abut tight against the O-shaped ring 711 mounted at the top of the outer-threaded section 71. And the second screw nut 43 also has the internal surface enclosing the V-shaped expanding side wall 65 of the indentation 64 disposed at the lower section of the rotary water-sealing device 6. Thus, the connecting tube 4 can shut off the water discharge via internal and external parts simultaneously, achieving double water-sealing benefit thereby. And, depending on the rotation of the shower head 7, the connecting tube 4 can also be switched into any angles in 360 degrees. The connecting tube 4 can be firmly coupled with the shower head 7 or any other water-discharging devices without the risk of water leakage. In addition, the connecting tube 4 will not get twisted or tied up and hinder the water discharge. Thus, the connecting tube 4 won't get worn off or damaged easily so as to keep indoors dry and clean, and increase its durability thereby. Moreover, the faucet 3 or the shower head 7 can also have one check valve 5 accommodated therein so as to prevent the flowing backwards of the remaining dirty water to the water supply. Please refer to FIG. 11. When applied to the bathroom for showering purpose, the connecting tube 4 has one end attached to the bottom of the faucet 3 and the other end coupled with the shower head 7. Please refer to FIG. 12. When combined with a washing machine 8, the connecting tube 4 can have the end capable of rotation in 360 degrees coupled with the washing machine 8 so that, wherever the washing machine 8 is moved in different positions, the connecting tube 4 will not get twisted or tied up to hinder the amount and pressure of water discharge and cause the malfunction of the washing machine 8 thereby.

Figure 13:
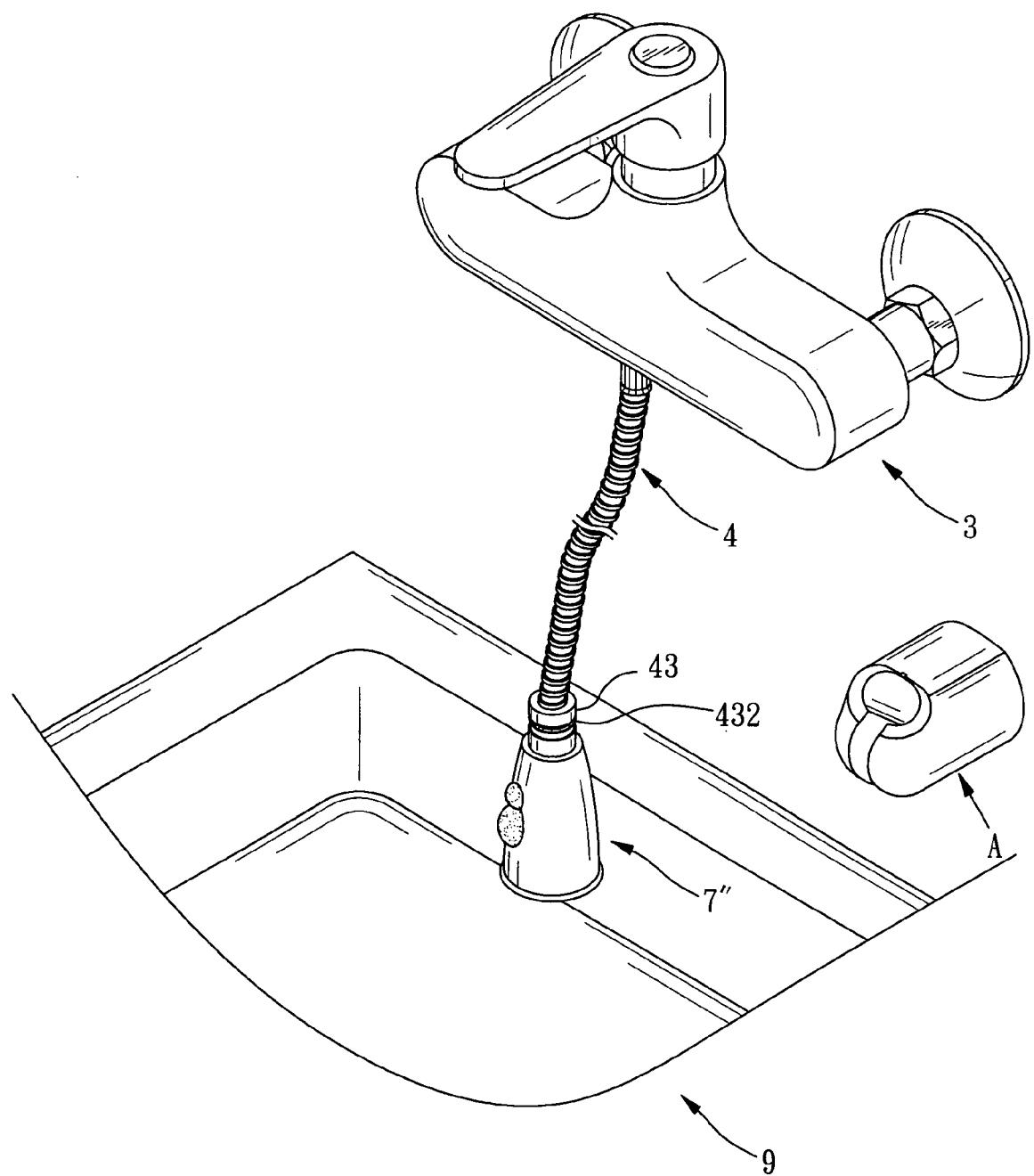
FIG. 13 is a diagram showing the present invention applied to a kitchen counter.
Figure 14:
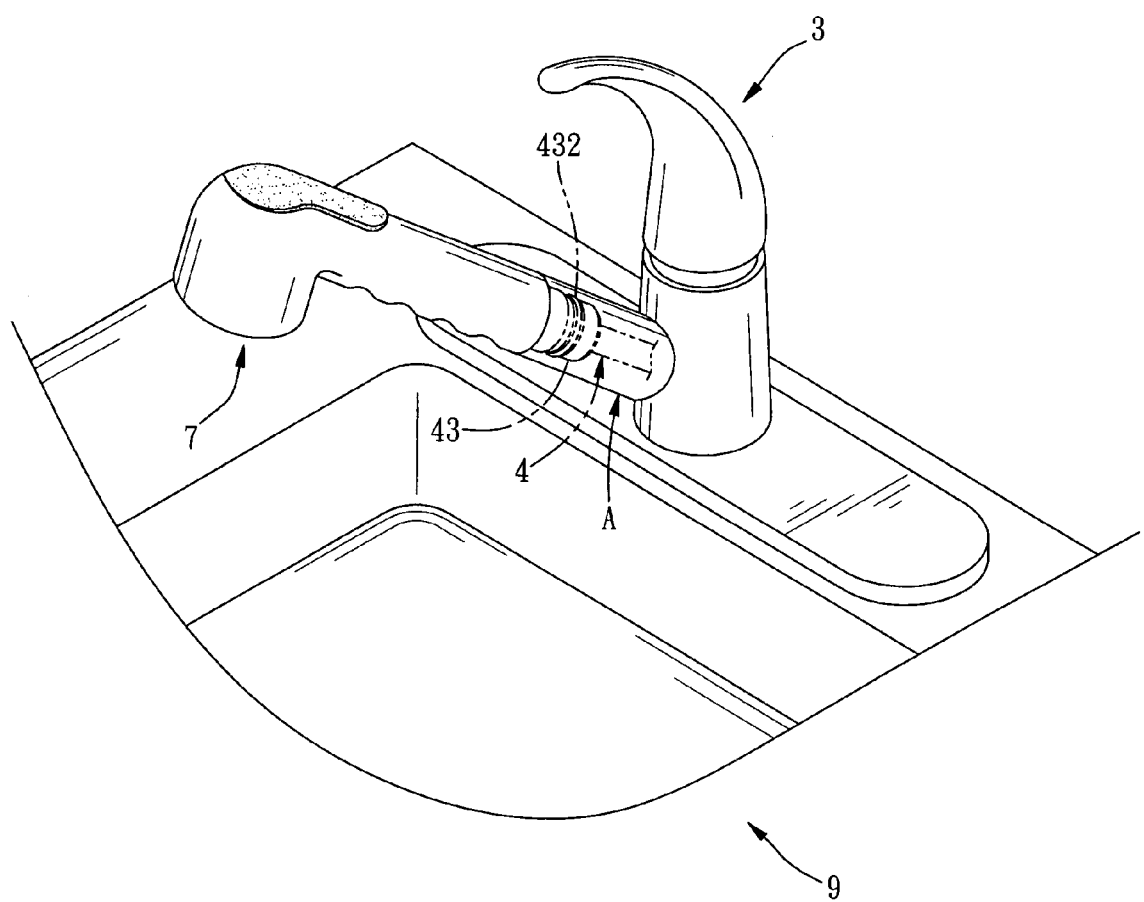
FIG. 14 is another diagram showing the present invention applied to the kitchen counter.
Figure 15:
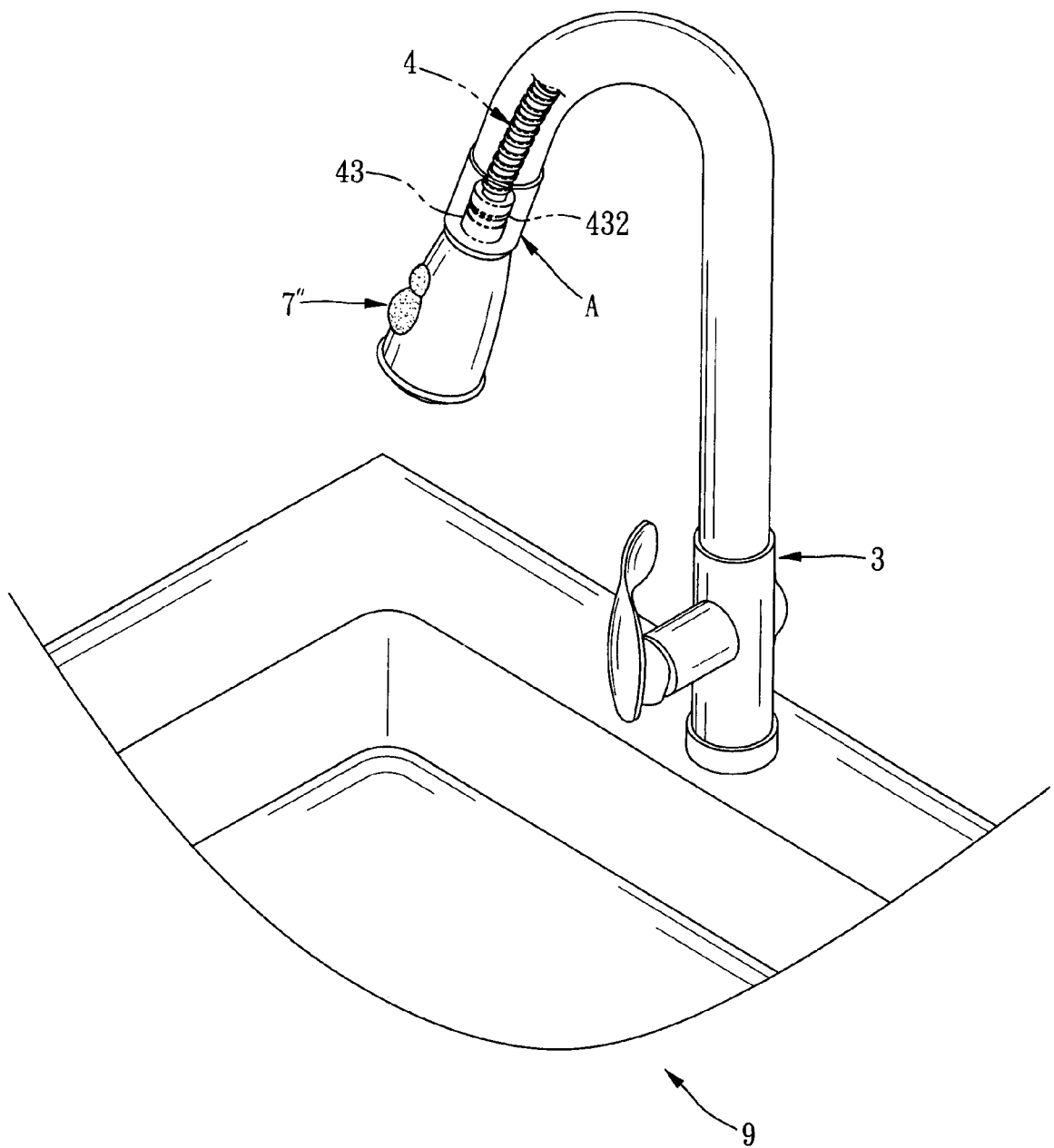
FIG. 15 is a third diagram showing the present invention applied to the kitchen counter.

Please refer to FIG. 13. When applied to the kitchen for cleaning purpose, the connecting tube 4 can have one end attached to the bottom of the faucet 3 and the other end coupled with a press-type water-discharge body 7". The press-type water-discharge body 7" can be adjusted and positioned into any directions via the connecting tube 4 molded into a snake-tube shape. The connecting tube 4 can be freely rotated to fit to the need of users without getting wound or tied up in the process thereof. Besides, the connecting tube 4 can also be widely applied to both indoor and outdoor objects, such as a kitchen counter 9 as shown in FIGS. 14, 15.

Figure 16:
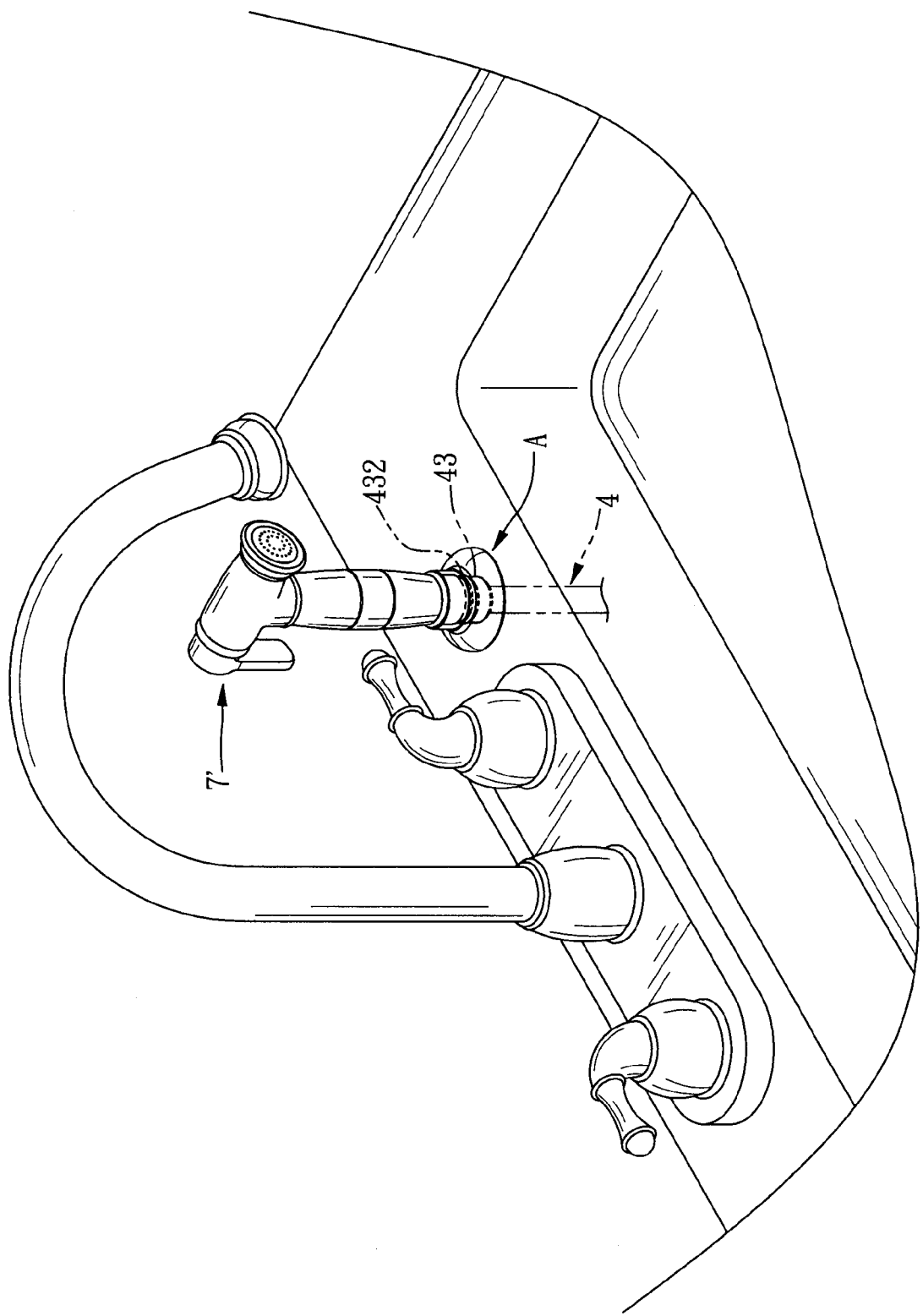
FIG. 16 is a fourth diagram showing the present invention applied to the kitchen counter.
Figure 17:
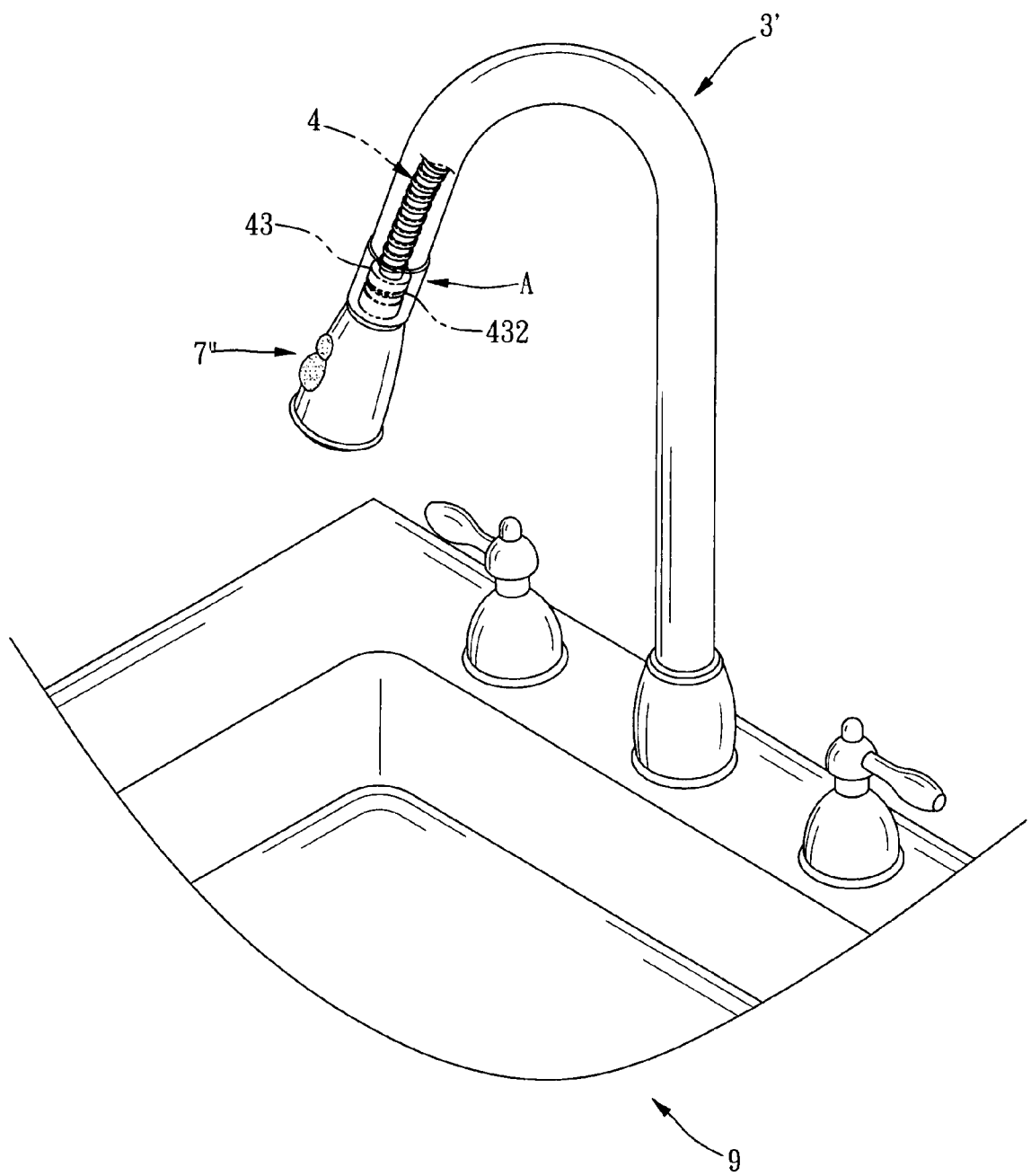
FIG. 17 is a fifth diagram showing the present invention applied to the kitchen counter.

The second screw nut 43 of the connecting tube 4 can be mounted to the bottom of a spray gun 7' as shown in FIG. 16. In addition, the connecting tube 4 can also be made into a snake tube to conceal inside an outer tube 3', and attached to a press-type water-discharge body 7" at one end as shown in FIG. 17.

The second screw nut 43 also has an annular indentation 431 defining the outer periphery thereon to which a flexible sleeve 432 is mounted so that when the shower head 7, the spray gun 7', or the press-type water-discharge body 7" is held and located in place, the flexible sleeve 432 can abut against the internal surface of a positioning housing A so as to stably position the shower head 7, the spray gun 7' or the press-type water-discharge body 7" and avoid the risk of shaking or bumping thereof.

What is claimed is:

1. A connecting tube structure comprising: a connecting tube, screw nuts, check valves, and a rotary water-sealing device wherein the connecting tube has both ends respectively coupled with one screw nut, and one end attached to a faucet with a threaded tube defined by outer screw threads extending at the bottom thereon while the other end mounted to a shower head equipped with an outer-threaded section;

the connecting tube has a stop plate disposed at one end, and the stop plate is also inserted to a grooved seat extending at a top of the rotary water-sealing device thereon;

the rotary water-sealing device includes an upper section defined by at least one ringed groove with a watertight O-ring adapted thereto to abut tight against an internal surface of the shower head for water-sealing purpose thereby; the rotary water-sealing device also has a lower section defined by an indentation with a V-shaped outward-expanding plastic side wall extending thereon to abut against an internal surface of the screw nut secured to the outer-threaded section defining a lower section of the shower head for water-sealing purpose as well;

wherein each watertight O-ring abutting against the internal surface of the shower head to achieve internal water-sealing purpose, and the V-shaped plastic side wall as well as an O-shaped ring clamped between the shower head and the screw nut secured to the outer-threaded section of the shower head also provide external water-sealing effect, achieving double water shutoff benefits thereby; thus, the connecting tube is rotatable in 360 degrees with high-and-lower pressure water-sealing benefit to avoid the risk of getting twisted and tied up, and to ensure smooth transport of water supply thereby.

2. The connecting tube structure as claimed in claim 1, wherein the connecting tube is applied to a bathroom for showering purpose.

3. The connecting tube structure as claimed in claim 1, wherein the connecting tube is applied to a kitchen for cleaning purpose.

4. The connecting tube structure as claimed in claim 1, wherein the connecting tube is applied to a washing machine.

5. The connecting tube structure as claimed in claim 1, wherein the connecting tube is utilized as various indoor and outdoor coupling tubes thereof.

6. The connecting tube structure as claimed in claim 1, wherein the connecting tube has one end defined by a cavity with an external-threaded section disposed thereon, to which one check valve of the check valves is accommodated to prevent the return of water flow thereby.

7. The connecting tube structure as claimed in claim 1, wherein the connecting tube has one check valve of the check valves mounted onto the stop plate accommodated into the bottom of the shower head.

8. The connecting tube structure as claimed in claim 1, wherein one screw nut of the screw nuts has an annular indentation defining the outer periphery thereon for the mounting of a flexible sleeve thereto.

* * * * *